United States Patent
Kim et al.

(10) Patent No.: US 6,891,889 B2
(45) Date of Patent: May 10, 2005

(54) SIGNAL TO NOISE RATIO OPTIMIZATION FOR VIDEO COMPRESSION BIT-RATE CONTROL

(75) Inventors: Hyun Mun Kim, Scottsdale, AZ (US); Hyung-Suk Kim, Chandler, AZ (US); Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 09/947,331

(22) Filed: Sep. 5, 2001

(65) Prior Publication Data

US 2003/0072364 A1 Apr. 17, 2003

(51) Int. Cl.[7] ................................................ H04B 1/66
(52) U.S. Cl. ........................... 375/240.03; 375/240.02; 375/240.05; 375/240.07; 375/240.24; 375/240.26; 375/240.04; 382/239; 382/251
(58) Field of Search ....................... 375/240.03, 240.02, 375/240.05, 240.07, 240.24, 240.26, 240.04; 382/239, 251

(56) References Cited

U.S. PATENT DOCUMENTS

| | | | | |
|---|---|---|---|---|
| 5,121,216 A | * | 6/1992 | Chen et al. .................. 382/239 |
| 5,262,855 A | * | 11/1993 | Alattar et al. ........... 375/240.21 |
| 5,737,537 A | * | 4/1998 | Gardos et al. .............. 358/539 |
| 5,745,178 A | * | 4/1998 | Hartung et al. ......... 375/240.04 |
| 6,141,380 A | * | 10/2000 | Krishnamurthy et al. ...................... 375/240.02 |
| 6,351,491 B1 | * | 2/2002 | Lee et al. .............. 375/240.03 |
| 6,363,115 B1 | * | 3/2002 | Doux ..................... 375/240.16 |
| 6,408,027 B2 | * | 6/2002 | Mori et al. ............ 375/240.05 |

* cited by examiner

*Primary Examiner*—Shawn S. An
(74) *Attorney, Agent, or Firm*—Marger Johnson & McCollom, PC

(57) ABSTRACT

A method of determining a quantization parameter for video compression. A block characteristic for blocks in a video frame is quantized and then used to obtain a candidate quantization parameter. With the candidate quantization parameter, a number of bits for the blocks in the video frame is summed, producing a candidate bit rate. If the candidate bit rate is greater than a predetermined bit rate threshold, the candidate quantization parameter is set as the quantization parameter.

12 Claims, 3 Drawing Sheets

SIGNAL TO NOISE RATIO OPTIMIZATION FOR VIDEO COMPRESSION BIT-RATE CONTROL

BACKGROUND

1. Field

This disclosure relates to video compression, more particularly to methods of rate control in video compression.

2. Background

Digitization of video sequences allow for easy transmission of these sequences across data networks. Additionally, digitization allows for manipulation of the data to correct artifacts and faults in the sequence. However, a digital representation of a video sequence uncompressed requires too much bandwidth to make transmission very practical. Therefore, most of these sequences are compressed.

The goal of most compression techniques is to provide the maximum amount of compression with least amount of error in the reconstructed technique. Compression generally involves reducing redundant data in such a manner that the redundant data can be recreated at the other end, allowing an accurate reconstruction of the video images. Generally, most techniques attempt to remove both spatially and temporally redundant data. One particular technique is that of predictive coding such as that used in the H.26X family of compression standards from the International Telecommunication Union (ITU), or the MPEG (Moving Pictures Experts Group) family of standards.

Generally, predictive coding techniques rely upon three different types of pictures within their schemes. A picture is analogous to a video frame or field, depending upon the standard. I pictures are intracoded pictures, coded without reference to other pictures. Moderate compression is achieved by reducing spatial redundancy, but not temporal redundancy. They can be used periodically to provide access points in the bit stream where decoding can begin. P frames or pictures are predictive pictures and can use the previous I- or P-picture for motion compensation and may be used as a reference for further prediction. P-pictures offer increased compression compared to I-pictures. B pictures are bidirectionally-predictive pictures and can use the previous and next I- or P-pictures for motion-compensation, and offer the highest degree of compression.

In addition to compression percentage and the error rate in the reconstructed picture, another consideration lies in the area of rate control. Constant bit rate (CBR) control generally desires to provide a constant bit rate of compressed data, avoiding huge swings in bandwidth requirements. The challenge becomes to produce accurate reconstructed images, while providing high compression at a predetermined bit rate.

The MPEG standards have achieved some accomplishments in this area. These standards have become wide spread and most work in this area attempts to maintain compatibility with these approaches. In general rate control processes, such as MPEG-2 TM5 (test model 5) and MPEG-4 Q2, the target bit rate is computed based on the bits available and the last encoded frame bits. If the last frame is complex and uses excessive bits, more bits should be assigned to this frame. However, if there are fewer bits left for encoding, fewer bits will be assigned to this frame because of the required bit rate. This can lead to inaccurate reconstructed images, reducing the image quality and proving the compression technique to be unsatisfactory.

It would be useful to have a bit rate control technique that can operate within established standards, have lower computational complexity and still provide higher quality images.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
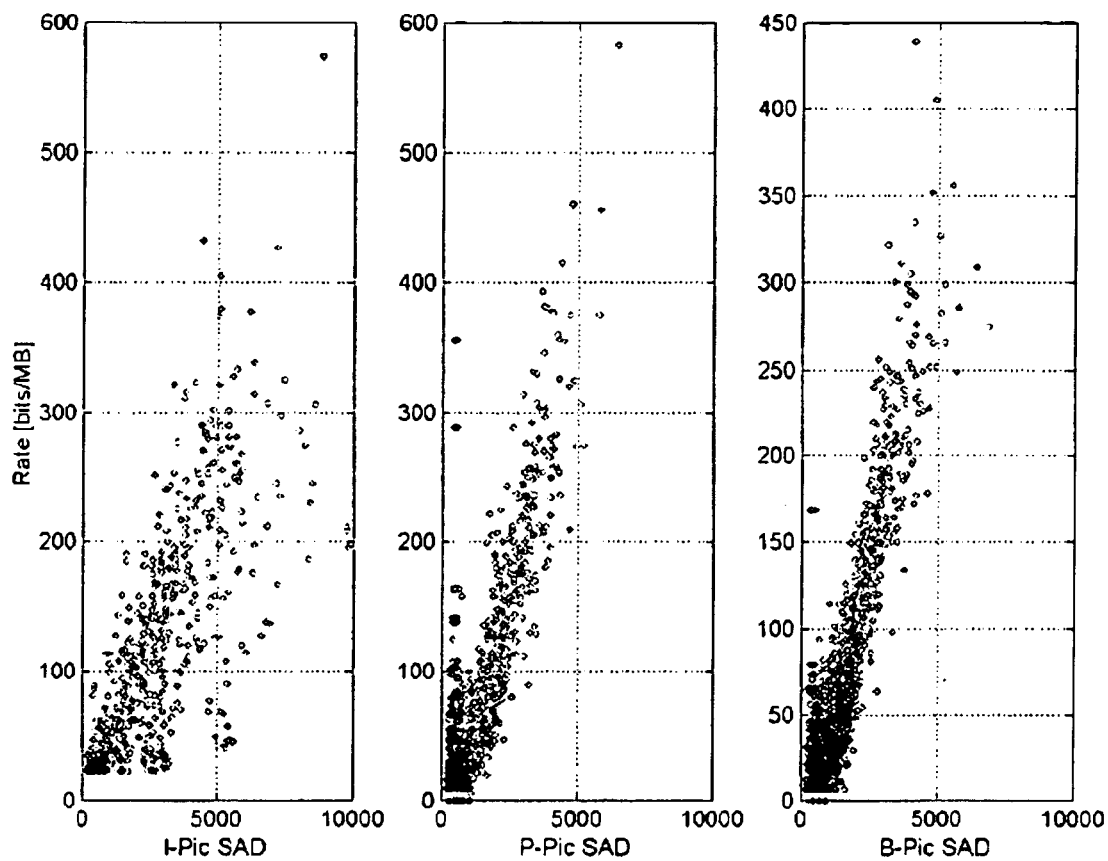
FIG. 1 shows graphical representations of a block characteristic versus bit rate data sets, in accordance with the invention.

Rate control is one of the very important issues in video encoding. Most techniques desire to control the video bit-rate to meet the target rate while pursuing maximum video quality. The rate varies depending on its prediction mode, motion vector choices and displaced frame difference (DFD) coding fidelity. Displaced frame difference is one measure of error between the predicted frame and the original frame. Once the prediction mode and motion vectors are decided, the quantization parameters (QP) control the DFD coding fidelity.

One aspect of the invention is a new video bit-rate control process that addresses the above problem. It is worth noting while it is typical to dismiss mean squared error (MSE) as being poorly correlated to human perception, systems based on a perceptually meaningful framework can be optimized for MSE performance with excellent results not only in MSE but also in terms of perceptual quality. Based on this observation, embodiments of the invention strive to accomplish the maximum reconstructed perceptual quality by maximizing the SNR while maintaining the target bit rate.

As mentioned above, rate control processes, such as MPEG-2 TM5 and MPEG-4 Q2, the target bit rate is computed based on the bits available and the last encoded frame bits. If the last frame is complex and uses excessive bits, more bits should be assigned to this frame. However, if there are fewer bits left for encoding, fewer bits will be assigned to this frame because of the required bit rate. A weighted average in these processes reflects a compromise of these two factors. Once the target bit rate is decided it computes the QP value.

To solve the quantization parameter $QP_i$ for the current frame i, Q2 models the encoder rate distortion function as follows:

$$R_i = X_1 \cdot \frac{S_i}{QP_i} + X_2 \cdot \frac{S_i}{QP_i^2}$$

where $R_i$ denotes the total number of bits used for the current frame i excluding bits used for header and motion vectors and $S_i$ denotes mean absolute difference between the reference frame and the current frame i. The modeling parameters are denoted as $X_1$ and $X_2$. Q2 estimates the modeling parameters using least square (LS) method based on the previous data:

$$X_1 = \frac{\sum_{i=1}^{n} \frac{QP_i \times R_i}{S_i} - X_2 \times QP_i^{-1}}{n},$$

$$X_2 = \frac{n\sum_{i=1}^{n} \frac{R_i}{S_i} - \left(\sum_{i=1}^{n} QP_i^{-1}\right)\left(\sum_{i=1}^{n} \frac{QP_i \times R_i}{S_i}\right)}{n\sum_{i=1}^{n} QP_i^{-2} - \left(\sum_{i=1}^{n} QP_i^{-1}\right)}$$

where n is the number of selected past frames. When the bit budget, or predetermined bit rate threshold is established, the method needs to solve the above quadratic equation for QP. It keeps updating the quadratic R-D model using the latest data after removing outliers for better modeling. However, this approach is not only computationally complex but also requires additional memory. Despite all the efforts to make this quadratic model accurate, it cannot map the rate and QP relationship properly due to the inherent limitation of LS methodology. This manifests itself as insufficient data points. It hardly meets the target bit rate for all test images.

Also experimental results show that Q2 process attempts to maintain the desired bit-rate by dropping frames, which obviously degrade the reconstructed video quality. There is a demand to develop new bit-rate control process to avoid this frame skipping.

As discussed above, in predictive coding techniques, there are three types of pictures in video frames: I, P, and B pictures. I pictures are intra-frame coded without reference to any other frames. The P pictures are predictive coded using previously reconstructed reference frames. The B pictures are usually coded using backward and forward reference frames and achieve highest possible compression amongst all these three types of pictures. Practical motion vectors are computed by Sum-of-Absolute-Difference (SAD) based block-matching scheme. A motion vector MV is represented by two components (MVx, MVy), where MVx and MVy are the motion vector components in horizontal and vertical directions respectively.

$$SAD = \min_{(x,y) \in S} \sum_{j=0}^{15} \sum_{i=0}^{15} |C[i, j] - R[x_0 + x + i, y_0 + y + j]|,$$

where $(x_0, y_0)$ are the upper left corner coordinates of the current macroblock, C[x, y] are the current macroblock luminance samples, R[x, y] are the reconstructed previous frame luminance samples, and S is the search range: {(x,y): $-16 \leq x, y < 16$}. A macroblock is generally a 16×16 block of values for the current frame.

One embodiment of the invention computes the SAD values in all or some selected search points in the search space (S) depending upon the motion estimation process. The motion vector (MVx, MVy) is selected based on the displacement of the search point that results in minimum SAD among all the SAD values in the search space. The SADs provide important information about the activities in the macroblocks as well as video frames. This information can be utilized to determine the QP for the video bit-rate control, as will be discussed in more detail further. For I pictures SAD was used with respect to the average value of its own block.

Assignment of the quantization parameter has an effect on the resulting bit rate. For example, take the number 45 expressed in binary values, 101101. If the quantization scale is 4, the number 45 becomes 1011, basically dropping the last two bits to go from $2^6$ to $2^4$, essentially dividing by 4. This allows the number to be expressed in fewer bits. If the quantization parameter is 8, then 45 becomes 5, 101, dropping another bit to allow the original number to be expressed in 3 bits instead of 4. This is merely a simplified example of how control of the quantization parameter can affect the bits necessary for quantizing a particular value.

Once the bit rate is decided for the current picture, the method must assign the quantization parameter (QP) that meets the target bit rate. For this purpose a single QP or different QPs within a picture may be used depending on optimization criteria. The macroblock level rate control requires the differential quantization parameter in most video standards. According to the requirement of the MPEG4 video coding standard, the maximum difference is 2. The process may be discussed with regard to two major steps. First, calculate a single QP that is a sufficient estimate of the given bit rate. Second, maximize the signal-to-noise (SNR) ratio.

In estimating the single QP, the nonlinear regression method is used to find the conditional mean of the quantization parameter. This conditional mean can be obtained upon estimating joint probability density function (PDF). So the goal can be rephrased as finding QP using the conditional mean E[QP| rate,a-posteriori-condition]. One can use any aposteriori condition using available data or observation. For example Q2 uses the mean absolute difference (MAD) of the current frame. The single MAD for whole frame gives only global information and lacks in local discrimination power in the macroblock level. It might be the part of the reason that Q2 rate control does not perform well. One embodiment of the invention accomplishes the local discrimination capability by considering SADs of whole macroblock of the current frame. It may solve the non-linear function $MB_{rate}=f(QP,SAD, picture\_type)$ in terms of joint PDF. Training vectors (samples) give probabilities associated with the quantization parameter (QP) and the rate spent for macroblock ($MB_{rate}$) depending on the sum of absolute difference (SAD). The learned probability function is used to estimate the conditional mean.

Let the random variables $X_1$, $X_2$, $X_3$ and Y denote the QP, SAD, picture_type and the rate spent for macroblock ($MB_{rate}$) respectively. The joint probability density function can be estimated using Parzen's window.

$$\hat{f}_n(x_1, x_2, x_3, y) = \frac{1}{n\sigma^4} \sum_{i=1}^{n} k\left(\frac{x_1 - x_1^i}{\sigma}\right) k\left(\frac{x_2 - x_2^i}{\sigma}\right) k\left(\frac{x_3 - x_3^i}{\sigma}\right) k\left(\frac{y - y_i}{\sigma}\right)$$

where k stands for a Parzen's weighting function. So one can solve the conditional mean.

$$\hat{\phi}(x_2, x_3, y) = \hat{E}(X_1 \mid X_2 = x_2, X_3 = x_3, Y = y)$$

$$= \frac{\int_{-\infty}^{\infty} x_1 \hat{f}_n(x^1, x^2, x^3, y) dx_1}{\int_{-\infty}^{\infty} \hat{f}_n(x^1, x^2, x^3, y) dx_1}$$

$$= \frac{\int_{-\infty}^{\infty} x_1 \sum_{i=1}^{n} k\left(\frac{x_1 - x_1^i}{\sigma}\right) k\left(\frac{x_2 - x_2^i}{\sigma}\right) k\left(\frac{x_3 - x_3^i}{\sigma}\right) k\left(\frac{y - y_i}{\sigma}\right) dx_1}{\int_{-\infty}^{\infty} \sum_{i=1}^{n} k\left(\frac{x_1 - x_1^i}{\sigma}\right) k\left(\frac{x_2 - x_2^i}{\sigma}\right) k\left(\frac{x_3 - x_3^i}{\sigma}\right) k\left(\frac{y - y_i}{\sigma}\right) dx_1}$$

$$= \frac{\sum_{i=1}^{n} x_1^i k\left(\frac{x_2 - x_2^i}{\sigma}\right) k\left(\frac{x_3 - x_3^i}{\sigma}\right) k\left(\frac{y - y_i}{\sigma}\right)}{\sum_{i=1}^{n} k\left(\frac{x_2 - x_2^i}{\sigma}\right) k\left(\frac{x_3 - x_3^i}{\sigma}\right) k\left(\frac{y - y_i}{\sigma}\right)}$$

since $\dfrac{\int_{-\infty}^{\infty} x_1 k\left(\frac{x_1 - x_1^i}{\sigma}\right) dx_1}{\int_{-\infty}^{\infty} k\left(\frac{x_1 - x_1^i}{\sigma}\right) dx_1} = x_1^i$.

It is possible to estimate the above equation using long training image sequences. But it needs to estimate 4-dimensional PDF that requires huge training data to cover the whole range of possible data set. It would be very difficult to obtain such training due to the skewed data set. It is crucial that sampled data cover the wide range of probable events.

To solve this problem one may apply classified vector quantization, which helps reduce the dimensionality while increasing the accuracy. Vector quantization is a technique that uses a set of vectors, called code vectors, as estimates of data. Generally, a signal to be quantized is considered as a series of vectors x, containing N samples. The vectors in the set of x are quantized in terms of code vector, y, to which the corresponding samples are the closest. For example, if a codebook has the following code vectors:

$y_1=(0,0)$, $y_2=(2,1)$, $y_3=(1,3)$ and $y_4=(1,4)$;

and the signal vector, x, was 0 1 2 3 2 0, the sequence of 1, 3, 2 may be sent to the decoder for the signal pairs 01 23 20. The decoder would then use the same codebook and decode that sequence to 0 0 1 3 2 1, with a corresponding error value. This type of quantization can be used here.

The codebook holding the code vectors is typically acquired by using training sets. A starting set of vectors are used and then compared to the training set. When the decoded errors are too large, the code vector values are adjusted. This continues until the decoded error values are of acceptable levels. The resulting vectors are used as the codebook to encode data, such as the results of the equation above.

The training data is collected depending on the picture type and the quantization parameter (QP). It can be implemented by disengaging the rate control. One approach may encode the test image sequence by fixing the QP within an admissible range and store the SAD value along with the bits actually spent for each macroblock. FIG. 1 shows this $(QP, SAD, picture\_type, MB_{rate})$ data set when QP=10. These data pairs were generated by changing QP from 1 (maximum quality) to 31 (minimum quality).

The data set is large enough because for single image sequence one could generate n-training set where n is the number of admissible QP values and the data set is "complete" in this sense. This data set gives local characteristics of the current frame and the estimator would be more accurate.

Using this data set, one may define a new joint PDF by fixing QP and picture_type $$\hat{f}_{n,QP,picture\_type}(x_2, y) = \frac{1}{n\sigma^2} \sum_{i=1}^{n} k\left(\frac{x_2 - x_2^i}{\sigma}\right) k\left(\frac{y - y_i}{\sigma}\right).$$

The following conditional mean estimate may now be obtained.

$\hat{\phi}_{QP,picture\_type}(x_2) = \hat{E}[MB_{rate} \mid SAD, QP, picture_{13} type]$.
Solving the above further gives $$\hat{\phi}_{QP,picture\_type}(x_2) = \hat{E}(Y \mid X_2 = x_2)$$

$$= \frac{\sum_{i=1}^{n} y_i k\left(\frac{x_2 - x_2^i}{\sigma}\right)}{\sum_{i=1}^{n} k\left(\frac{x_2 - x_2^i}{\sigma}\right)}$$

Note that sample data $(x_2^i, y_i)$ in the above equation are obtained by fixing QP value and picture_type.

The equation above may be simplified using vector quantization (VQ) since storing all the training data set to solve this equation makes the estimator too complex to implement in real time.

Figure 2:
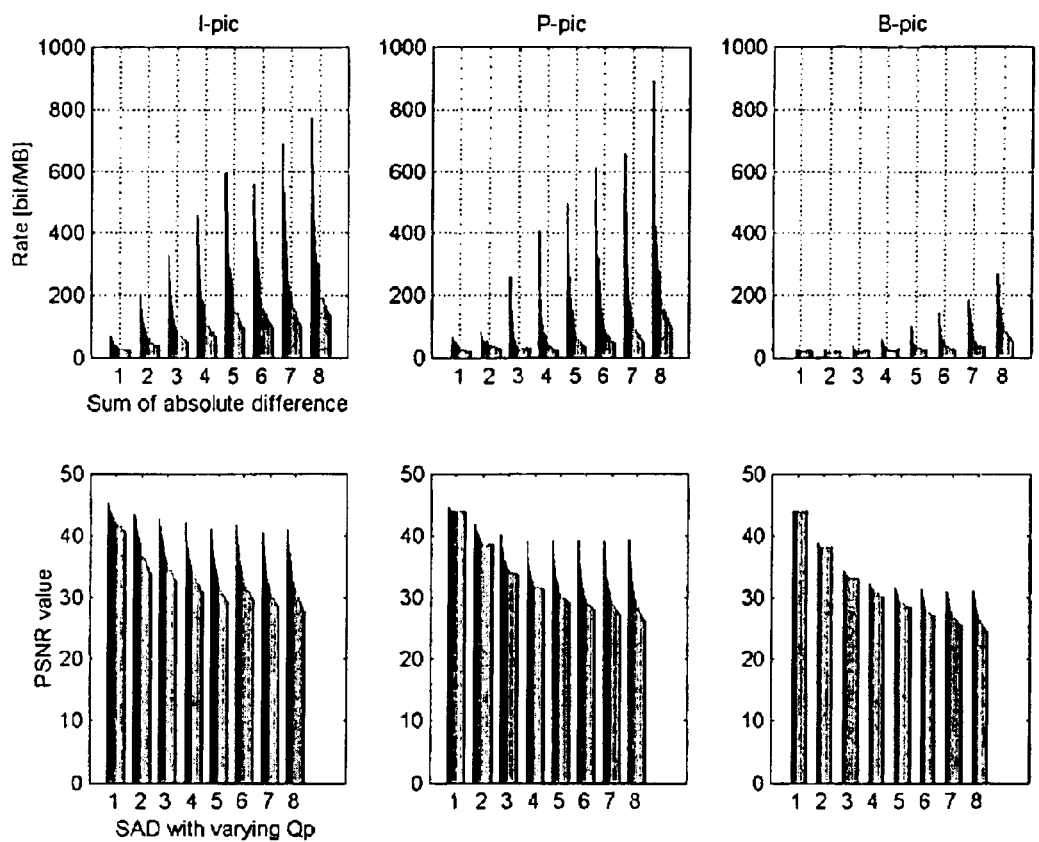
FIG. 2 shows graphical representations of a block characteristic versus bit rate for different picture types and the corresponding relationship between the block characteristic and the peak signal-to-noise ratio for possible quantization parameters (QP), in accordance with the invention.

One can now calculate the mean rate for each SAD bin. The n data pairs are clustered into $\bar{m}$ data pairs where m is the number of SAD bins. Suppose $\bar{y}_i$ represents the mean rate for i-th SAD bin and m window functions are used that are mutually exclusive then the above equation becomes $$\hat{\phi}_{QP,picture\_type}(x_2) = \frac{\sum_{i=1}^{n} y_i k\left(\frac{x_2 - x_2^i}{\sigma}\right)}{\sum_{i=1}^{n} k\left(\frac{x_2 - x_2^i}{\sigma}\right)}$$

$$\cong \frac{\sum_{i=1}^{m} \bar{y}_i k\left(\frac{x_2 - \bar{x}_2^i}{\sigma}\right)}{\sum_{i=1}^{m} k\left(\frac{x_2 - \bar{x}_2^i}{\sigma}\right)}$$

$$= \bar{y}_i$$

where it is assumed that $x_2$ belongs i-th SAD bin. Now it is possible to calculate the conditional mean by precalculating the average rate for each SAD bin. The above example uses 8 bins to quantize the SAD. FIG. 2 shows the results of applying AVQ to the training data. The 8 bars in each figure actually consists of 31 $\hat{\phi}_{QP,picture\_type}(x_2) = \hat{E}[MB_{rate} \mid SAD]$ values which corresponds to QP=1 to QP=31 from left to right. It can also be viewed as the R-D curve depending on SAD values. The bottom figures replace the rate in the above picture with PSNR (peak signal-to-noise) value.

Solving $QP^* = E[QP \mid rate]$ using $\hat{\phi}_{QP,picture\_type}(x_2) = \hat{E}[MB_{rate} \mid SAD]$, leads to $$QP^* = \operatorname*{argmin}_{QP} \left( \sum_{i=1}^{n} E[MB_{rate} \mid SAD_i] \right) \le rate$$

where n is the number of macroblocks in a frame.

This equation can be solved discretely by storing $\hat{\phi}_{QP,picture\_type}(x_2) = \hat{E}[MB_{rate} \mid SAD]$ into three simple look-up tables for I, P and B pictures. Once the bit budget, a predetermined bit rate threshold, for a picture level is decided these tables are used to choose the optimum QP values for a given rate.

Figure 4:
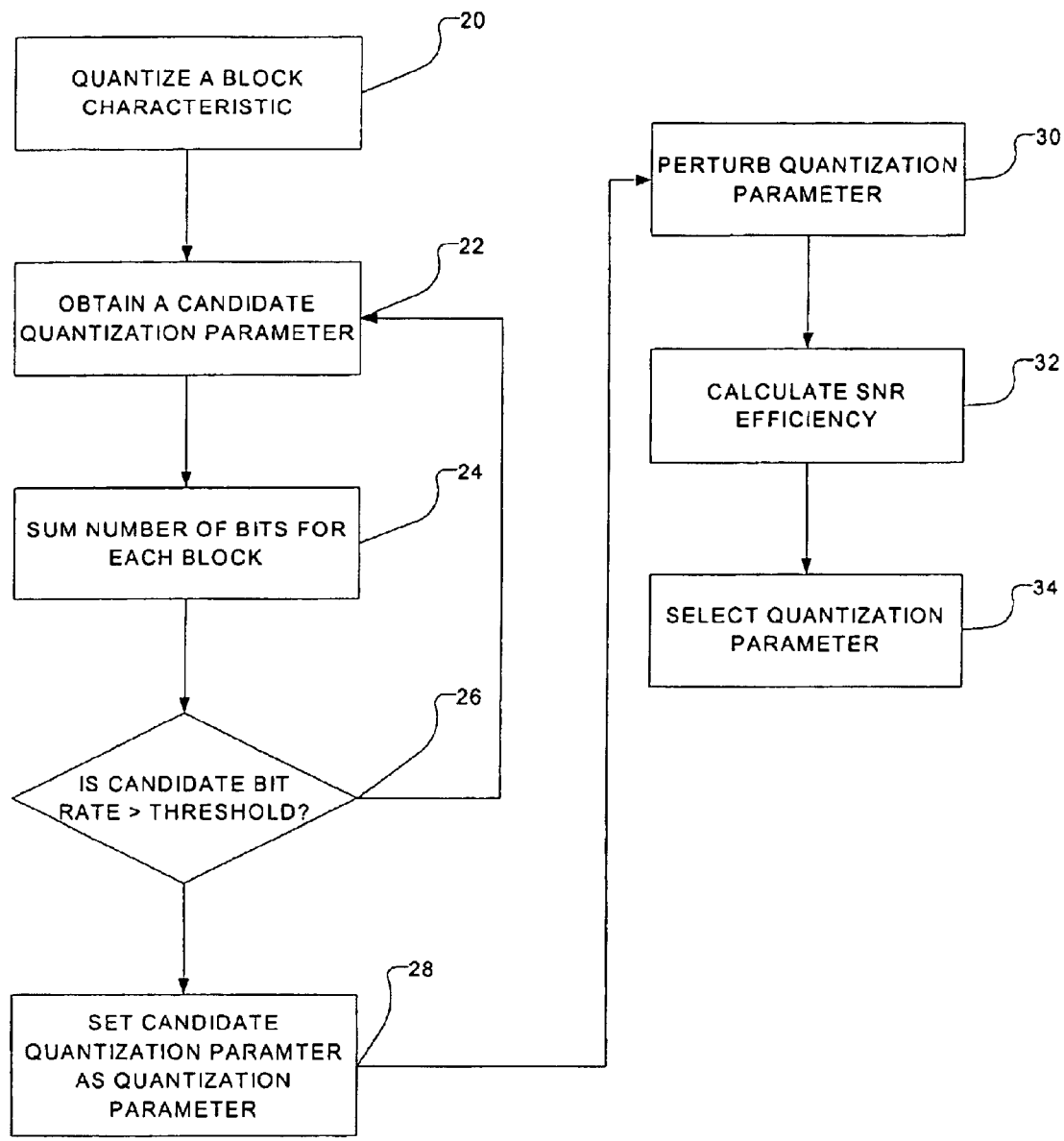
FIG. 4 shows a flowchart of one method to establish a quantization parameter within a given bit rate constraint, in accordance with the invention.

A flowchart of one embodiment of such a method is shown in FIG. 4. At 20, a block characteristic is quantized. This will provide the index to the look-up tables that will then lead to a candidate quantization parameter. In the example above, the block characteristic is the sum of absolute differences (SAD). It can be calculated as follows:

$$\text{index} = \frac{SAD}{\text{bin\_size}}$$

$$\text{where bin\_size} = \frac{\text{range}}{\text{no\_bin}}.$$

The range of SAD may be obtained by looking at the training data. The ranges vary depending on picture types. In one experiment, the number of pairs, or bins, was no_bin=8. There are 8 types of macroblocks for each I, P and B pictures. Since the SAD information is obtained after motion estimation the SAD index can be found by single division.

Using the SAD index, a candidate quantization parameter is obtained at 22. In one embodiment, the maximum permissible QP parameter for that index is used. Using the candidate QP and the SAD, the number of bits that would be required to encode each block is determined and summed up at 24. The resulting sum is the candidate bit rate for that picture. At 26, the candidate bit rate is compared to the predetermined bit rate threshold. If the candidate bit rate is greater than the bit rate, that candidate quantization parameter is set as the quantization parameter for that picture at 28. If the bit rate is less than the threshold, the quantization parameter is discarded, and the process returns to the point of obtaining a smaller quantization parameter. This process may be bounded by a minimal permissible quantization parameter.

In one embodiment, the maximum was set at 20 and used for I and P pictures and 28 was used for B pictures. The minimum was set at 3 for I and P pictures and 8 for B pictures. These values were chosen because of a desire for high image quality for reference images (I, P) and higher compression for B pictures.

Since the SAD needs to be calculated for P and B pictures the process only needs to calculate the SAD for I pictures to access the look up table. For I picture the process may calculate SAD with respect to average value of the macroblock. This process classifies each frame quickly by looking at the distribution of the quantized SAD. Since the number of macroblocks is small and only simple look-up tables need to be accessed, it reduces the complexity greatly compared with Q2. Most of all the process is relieved from the burden of updating R-D model by covering the admissible QP ranges using classified vector quantization.

In addition to providing a simpler means to determine an optimal QP value for bit rate control, the QP value may be further manipulated to provide the maximum signal-to-noise ratio within the bit rate constraints. In MPEG-4, one can change the QP value on a macroblock-wise basis by defining the dquant as follows:

$$dquant=Qp(\text{current }MB)-Qp(\text{previous }MB)$$

The admissible range of dquant is ±2. This can achieve the desired QP for the frame it can be perturbed to ±1 so that the maximum change will be ±2. To maximize the SNR, the training data set (QP,SAD,picture_type, SNR) is collected similar to how it was collected (QP,SAD,picture_type, $MB_{rate}$) to estimate the QP*. Applying the VQ technique may obtain the PSNR-QP relationship as shown in FIG. 2.

To maximize the SNR one can define a SNR efficiency $SNR_{eff}$(QP, i) of i-th SAD bin with QP as follows:

$$SNR_{eff}(QP, i) = \frac{SNR(QP, i) - SNR(QP+1, i)}{\text{rate}(QP, i) - \text{rate}(QP+1, i)}$$

This may maximize the SNR by calculating SNR efficiency that changes depending on QP and SAD bin. Once the process estimates QP* the process may go back to QP*+1. Then the process sorts SNR efficiency for QP and QP-1. The sorting should be done with one constraint such that $SNR_{eff}$ (QP-1,i) cannot precede $SNR_{eff}$ (QP1,i). This allows the process to change the QP sequentially. By pre-sorting this order depending on picture type and QP it can maximize the PSNR by changing the QP of macroblock that gives highest SNR efficiency until given bit budget is consumed.

This may be better understood with reference to FIG. 4. After obtaining the quantization parameter for the frame as discussed above, it is perturbed at 30. The SNR efficiency is then calculated for the perturbed QP at 32. A final quantization parameter is then selected at 34 based upon the perturbed values and the initial quantization parameter obtained at 28. This ensures a quantization parameter that meets the bit rate constraints and provides the maximum SNR.

The embodiments discussed above may indicate that there is an increased computation complexity as they need to calculate the SAD of each macroblock within a frame to assign bits for each macroblock. However, this does not incur an overhead for P and B frames because most techniques already need to calculate the SAD of each macroblock to determine the mode of macroblocks during the motion estimation. Hence it adds no overhead for the bit-rate control process.

The additional complexity comes only for I pictures. Once the rate is determined the only requirement is to quantize the bit rate and the SAD by single division. The process records the number of occurrences for each SAD bin to find the thresholds. Then the simple process is run to get the desired QP. Once the desired QP for the frame is obtained it is perturbed to ±1 so that the maximum change will be ±2. The perturbation can be done by accessing the look-up tables, as in one embodiment.

In comparison, Q2 estimates the modeling parameters using least square (LS) method based on the previous data. Then it solves the following equation:

$$Y=AX \rightarrow X=(A^TA)^{-1}A^TY$$

where
$A^T$ matrix transpose of A

After obtaining the solutions of the above equation, the Q2 process solves the quadratic equation with respect to Q. This method needs to solve the LS equation that involves matrix inverse calculation based on previous data that can grow up to 20 previous frames. Therefore it increases the computational complexity. Furthermore, it needs more memory since the Q2 method needs to update this data set, based on the most recent data set, to better model the rate distortion function.

A comparison was performed to compare the performance between Q2 rate control method and the proposed rate control method in accordance with the invention. The parameters for the experiment were as follows. The frame rate was 15 frames per second. The number of B frames between P and I frames was 2. The Intra period was 15 frames. Experiments were performed using MPEG-4 reference software. The experiment generated the training vectors using "Silent Voice" images running around 200 frames from QP=1 to QP=31. These vectors were used to generate the look up tables. The experiment obtained the average PSNR and actual rate by running each sequence for 100 frames. To compare the accuracy of rate controls a rate control (R/C) performance was defined as follows:

$$R/C\ Perf = \frac{ActualRate}{DesiredRate} \times 100\%$$

Essentially, this relationship means that more than 100% means over the budget and less than 100% means under the budget. It is highly desirable the resulting bit rate is as close to desired bit rate while remaining under the bit budget.

Simulation results show the methods in accordance with the invention outperformed the Q2 rate control process with great margin in terms of reproduced image quality and coding efficiency with much less complexity. The SAD values for each macroblock was good enough to adaptively adjust the QP to meet the bit budget. It gives the better image quality using much less bits. Most of all it keeps the bit rate very accurately.

|  |  | MPEG-4 Q2 | | | Proposed Process | | |
| --- | --- | --- | --- | --- | --- | --- | --- |
|  |  | PSNR [dB] | Rate [bits/VOP] | R/C Perf* [%] | PSNR [dB] | Rate [bits/VOP] | R/C Perf* [%] |
| QCIF | Image 1 | 31.04 | 7272 | 104.9 | 30.78 | 6812 | 98.2 |
| Desired Rate | Image 2 | 35.66 | 7441 | 107.3 | 35.43 | 6920 | 99.8 |
| 6932 | Image 3 | 35.45 | 7772 | 112.1 | 35.36 | 6917 | 99.7 |
| [bits/VOP] | Image 4 | 37.22 | 7117 | 102.6 | 37.41 | 6805 | 98.1 |

*Rate Control Performance = (Actual Rate /Desired Rate) × 100 [%]

Implementation of the above methods will more than likely be in software code provided on an article, such as a diskette, digital signal processor image file, or other type of computer-readable media. The article will contain code that, when executed, performs the methods of the invention.

Figure 3:
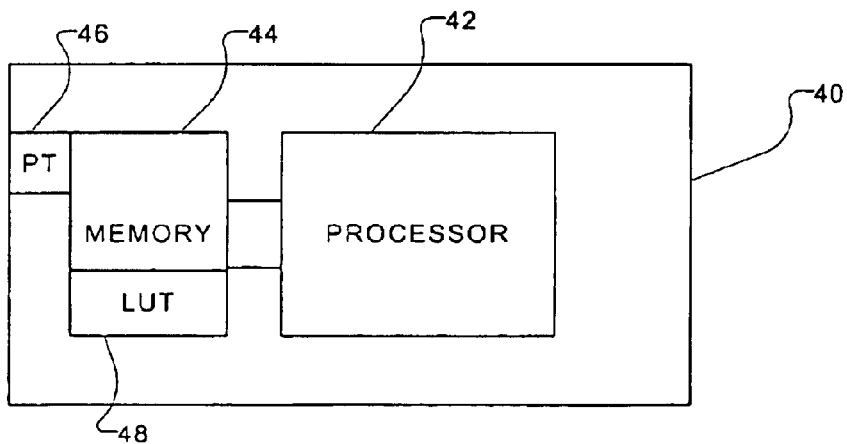
FIG. 3 shows one embodiment of a video encoder, in accordance with the invention.

In some instances, the implementation may take the form of a customized encoder/decoder, usually referred to as a codec. A codec in accordance with the invention is shown in FIG. 3. The codec 40 has an input port 46 through which it may receive video signals to be compressed. The signals may be temporarily stored in the memory 44, or may be sent directly to a processor 42. The processor 42 may be any processor or controller than can perform the operations set forth above, such as a general purpose processor, a digital signal processor, or other. The memory 44 may also contain the look-up table (LUT) 48 used to determine the quantization parameter based upon the SAD index, as discussed above.

Thus, although there has been described to this point a particular embodiment for a method and apparatus for obtaining a quantization parameter for video compression, it is not intended that such specific references be considered as limitations upon the scope of this invention except in-so-far as set forth in the following claims.

What is claimed is:

1. A method of determining a quantization parameter for video compression, the method comprising:
   quantizing a block characteristic for blocks in a video frame, producing a quantized block characteristic;
   using the quantized block characteristic to obtain a candidate quantization parameter;
   using the quantized block characteristic as an index to a look-up table of possible quantization parameter values, wherein producing the look-up table comprises defining a joint probability density function of a quantization parameter and a picture type, applying vector quantization to convert the joint probability density function to a set of code vectors, quantizing the block characteristic, and producing a look-up table with the quantized block characteristic as a table index and the code vectors as the values;
   summing a number of bits for the blocks in the video frame producing a candidate bit rate, wherein the quantized block characteristic and the candidate quantization parameter determine the number of bits per block; and
   setting the candidate quantization parameter as the quantization parameter for the frame, if the candidate bit rate is greater than a predetermined bit threshold.

2. The method of claim 1, wherein the method further comprises obtaining a new candidate quantization parameter and performing the summing, if the candidate bit rate is less than the predetermined bit threshold.

3. The method of claim 1, wherein the method further comprises the quantized block characteristic being the sum of absolute differences for the block.

4. The method of claim 1, wherein using the quantized block characteristic to obtain a candidate quantization parameter further comprises using the quantized block characteristic as an index to a look-up table of possible quantization parameter values.

5. The method of claim 1, wherein the code vectors are produced from estimates of a conditional mean value of the quantization parameter.

6. The method of claim 1, wherein the method further comprises:
   perturbing the quantization parameter to obtain a predetermined maximum change, producing a perturbed quantization parameter;
   applying vector quantization to obtain a pixel signal-to-noise ratio to quantization parameter relationship for each block of the video frame for the perturbed quantization parameter;
   calculating a signal-to-noise efficiency for each value of the perturbed quantization parameter;
   selecting the perturbed quantization parameter based upon the signal-to-noise efficiency and the predetermined bit threshold.

7. A video encoder, comprising:

a port to receive video signals;

a memory to store look-up tables of quantized block characteristics indexed to quantization parameter values, wherein creation of the look-up tables comprises defining a joint probability density function of a quantization parameter and a picture type, applying vector quantization to convert the joint probability density function to a set of code vectors, quantizing the block characteristic, and producing a look-up table with the quantized block characteristic as a table index and the code vectors as the values; and a processor to:

use the quantized block characteristic to obtain a candidate quantization parameter;

sum a number of bits for the blocks in the video frame producing a candidate bit rate, wherein the quantized block characteristic and the candidate quantization parameter determine the number of bits per block; and set the candidate quantization parameter as the quantization parameter for the frame, if the candidate bit rate is greater than a predetermined bit threshold.

8. The video encoder of claim 7, wherein the processor is also operable to obtain a new candidate quantization parameter if the candidate bit rate is less than the predetermined bit threshold.

9. The video encoder of claim 7, wherein the processor is also operable to:

perturb the quantization parameter to obtain a predetermined maximum change, producing a perturbed quantization parameter;

apply vector quantization to obtain a pixel signal-to-noise ratio to quantization parameter relationship for each block of the video frame for the perturbed quantization parameter;

calculate a signal-to-noise efficiency for each value of the perturbed quantization parameter;

select quantization parameters for each block based upon the signal-to-noise efficiency and the predetermined bit threshold.

10. An article containing machine-readable code that, when executed, cause a machine to:

quantize a block characteristic for blocks in a video frame, producing a quantized block characteristic;

use the quantized block characteristic to obtain a candidate quantization parameter;

sum a number of bits for the blocks in the video frame producing a candidate bit rate, wherein the quantized block characteristic and the candidate quantization parameter determine the number of bits per block;

set the candidate quantization parameter as the quantization parameter for the frame, if the candidate bit rate is greater than a predetermined bit threshold;

perturb the quantization parameter to obtain a predetermined maximum change, producing a perturbed quantization parameter;

apply vector quantization to obtain a pixel signal-to-noise ratio to quantization parameter relationship for each block of the video frame for the perturbed quantization parameter;

calculate a signal to noise efficiency for each value of the perturbed quantization parameter; and select the perturbed quantization parameter based upon the signal-to-noise efficiency and the predetermined bit threshold.

11. The article of claim 10, wherein the article contains further code that, when executed, causes the machine to obtain a new candidate quantization parameter and perform the summing, if the candidate bit rate is less than the predetermined bit threshold.

12. The article of claim 10, wherein the code causing the machine to use the quantized block characteristic to obtain a candidate quantization parameter further comprises code that causes the machine to use the quantized block characteristic as an index to a look-up table of possible quantization parameter values.

* * * * *